(12) United States Patent
Keinaenen et al.

(10) Patent No.: US 12,263,913 B2
(45) Date of Patent: Apr. 1, 2025

(54) AIR SUPPLY APPARATUS FOR A SHIP, SHIP INCLUDING THE SAME, AND METHOD FOR SUPPLYING AIR TO AN AIR LUBRICATION DEVICE

(71) Applicant: ACCELLERON SWITZERLAND LTD., Baden (CH)

(72) Inventors: Jari Keinaenen, Brugg (CH); Jean-Francois Tissot, Bergheim (FR)

(73) Assignee: ACCELLERON SWITZERLAND LTD., Baden (CH)

(*) Notice: Subject to any disclaimer, the term of this patent is extended or adjusted under 35 U.S.C. 154(b) by 175 days.

(21) Appl. No.: 17/918,486

(22) PCT Filed: Apr. 13, 2021

(86) PCT No.: PCT/EP2021/059507
§ 371 (c)(1),
(2) Date: Oct. 12, 2022

(87) PCT Pub. No.: WO2021/209422
PCT Pub. Date: Oct. 21, 2021

(65) Prior Publication Data
US 2023/0143335 A1  May 11, 2023

(30) Foreign Application Priority Data
Apr. 14, 2020 (EP) .................... 20169438

(51) Int. Cl.
*B63B 1/38* (2006.01)
*F02B 37/00* (2006.01)
(Continued)

(52) U.S. Cl.
CPC .............. *B63B 1/38* (2013.01); *F02B 37/005* (2013.01); *F02B 37/183* (2013.01); *F02B 39/10* (2013.01);
(Continued)

(58) Field of Classification Search
CPC .... F02B 37/001; F02B 37/004; F02B 37/013; F02B 37/005; F02B 37/04; F02B 37/10;
(Continued)

(56) References Cited

U.S. PATENT DOCUMENTS

2017/0260916 A1* 9/2017 Kraemer ................. F02B 75/20

FOREIGN PATENT DOCUMENTS

DE 102019119260 A1 * 1/2021
EP 0352063 A1 * 1/1990
(Continued)

OTHER PUBLICATIONS

Electronic English translation of DE 102019119260 A1 obtained Jun. 6, 2024.*

(Continued)

*Primary Examiner* — Ngoc T Nguyen
(74) *Attorney, Agent, or Firm* — Meunier Carlin & Curfman LLC

(57) ABSTRACT

An air supply apparatus for a ship is described. The air supply apparatus includes a first turbocharger having a first compressor and a first turbine being drivable by exhaust gas provided from one or more engines. The first compressor is coupled to the first turbine via a transmission configured for changing a speed of the first compressor. Additionally, the air supply apparatus includes an air lubrication device for resistance reduction of the ship. The first compressor is connected with the air lubrication device for supplying air to the air lubrication device.

20 Claims, 7 Drawing Sheets

(51) Int. Cl.
    *F02B 37/18*    (2006.01)
    *F02B 39/10*    (2006.01)
(52) U.S. Cl.
    CPC ... *B63B 2001/385* (2013.01); *B63B 2001/387* (2013.01)
(58) Field of Classification Search
    CPC ..... F02B 39/10; B63B 1/38; B63B 2001/385; B63B 2001/387
    See application file for complete search history.

(56) References Cited

FOREIGN PATENT DOCUMENTS

| | | | | |
|---|---|---|---|---|
| JP | 2013193624 A | | 9/2013 | |
| JP | 2021148078 A | * | 9/2021 | |
| KR | 20140083944 A | | 7/2014 | |
| KR | 20220138816 A | * | 10/2022 | |
| WO | 2014058008 A1 | | 4/2014 | |
| WO | WO-2016006258 A1 | * | 1/2016 | .............. B63B 1/38 |
| WO | 2017037186 A1 | | 3/2017 | |
| WO | WO-2019006527 A1 | * | 1/2019 | .............. F02B 29/00 |

OTHER PUBLICATIONS

Extended European Search Report issued for Application No. EP20169438.7, dated Jul. 6, 2020.
International Search Report and Written Opinion in International Application No. PCT/EP2021/059507, mailed Jul. 9, 2021, 27 pages.

* cited by examiner

AIR SUPPLY APPARATUS FOR A SHIP, SHIP INCLUDING THE SAME, AND METHOD FOR SUPPLYING AIR TO AN AIR LUBRICATION DEVICE

TECHNICAL FIELD

Embodiments of the present disclosure relate to an air supply apparatus of an air lubrication type ship for reducing water friction resistance. Further, embodiments of the present disclosure relate to a method of supplying air to an air lubrication device of a ship.

BACKGROUND

Generally, a ship receives friction resistance of water during marine navigation on its submerged surface of the ship's bottom. Especially for large ships, e.g. cargo ships, a large portion of the ship's hull resistance of results from friction resistance generated by relative flow of outside water at the ship's bottom.

To reduce ship's hull friction resistance air lubrication can be used, particularly by discharging air into surroundings of the ship's hull. The reduction of friction resistance has a large fuel economy improving effect, and thus represent effective means to reduce the $CO_2$ emission of the ship.

In the state of the art, there are various systems and approaches for the production of air bubbles for the hull lubrication. For instance, for the generation of air bubbles for hull lubrication, the prior art teaches direct usage of exhaust gas of the driving engine or to use separate electrical compressors or blowers. However, the known systems for hull lubrication have some disadvantages, for example in terms of energy consumption and efficiency.

Accordingly, in view of the above, there is a demand for improved air supply apparatuses for ships as wells as for improved methods of supplying air to an air lubrication device of ships which at least partially overcome the problems of the state of the art.

SUMMARY

In light of the above, an air supply apparatus for a ship and a method of supplying air to an air lubrication device of a ship according to the independent claims are provided. Further aspects, advantages, and features are apparent from the dependent claims, the description, and the accompanying drawings.

According to an aspect of the present disclosure, an air supply apparatus for a ship is provided. The air supply apparatus includes a first turbocharger having a first compressor and a first turbine being drivable by exhaust gas provided from one or more engines. The first compressor is coupled to the first turbine via a transmission configured for changing a speed of the first compressor. Additionally, the air supply apparatus includes an air lubrication device for resistance reduction of the ship. The first compressor is connected with the air lubrication device for supplying air to the air lubrication device.

Accordingly, the air supply apparatus of the present disclosure is improved compared to conventional apparatuses used for air lubrication type ships. In particular, embodiments of the air supply apparatus as described herein are improved with respect to energy efficiency. More specifically, by providing an air supply apparatus with a first turbocharger having a transmission coupling the first turbine with the first compressor for supplying air to the air lubrication device, the amount of air supplied to the air lubrication device can be controlled by using the transmission. More specifically, the first turbocharger, particularly the first compressor, is employed to compress low pressure air which subsequently is fed to the air lubrication device for air bubble generation under the vessel's hull to reduce water-hull friction of a ship. Less friction for the vessel's hull results in an overall reduction of energy usage of the ship. Accordingly, for example by employing the transmission to increase the speed of the first compressor compared to the speed of the first turbine the amount of air supplied to the air lubrication device can be increased resulting in an increased bubble generation under the vessel's hull. Thus, compared to the state of the art, a higher reduction of water-hull friction of the ship can be achieved. As result thereof, the overall reduction of energy usage of the ship can be reduced such that savings of fuel can be achieved resulting in a reduction of the overall operation costs.

Thus, according to a further aspect of the present disclosure, a ship including an air supply apparatus according to any embodiments described herein is provided.

According to another aspect of the present disclosure, a method of supplying air to an air lubrication device of a ship is provided. The method includes driving a first turbocharger by using exhaust gas from one or more engines. Additionally, the method includes changing a speed of a first compressor of the first turbocharger by using a transmission coupled to a first turbine and to the first compressor of the first turbocharger. Further, the method includes supplying air from the first compressor of the first turbocharger to the air lubrication device.

Accordingly, it is to be understood that embodiments of the present disclosure provide for an air supply apparatus, a ship including the air supply apparatus, and a method of supplying air to an air lubrication device of the ship, which are improved with respect to energy efficiency such that operation costs can be reduced.

BRIEF DESCRIPTION OF THE DRAWINGS

So that the manner in which the above recited features of the present disclosure can be understood in detail, a more particular description of the disclosure, briefly summarized above, may be had by reference to embodiments. The accompanying drawings relate to embodiments of the disclosure and are described in the following.

DETAILED DESCRIPTION OF EMBODIMENTS

Reference will now be made in detail to the various embodiments, one or more examples of which are illustrated in each figure. Each example is provided by way of explanation and is not meant as a limitation. For example, features illustrated or described as part of one embodiment can be used on or in conjunction with any other embodiment to yield yet a further embodiment. It is intended that the present disclosure includes such modifications and variations.

Within the following description of the drawings, the same reference numbers refer to the same or to similar components. Generally, only the differences with respect to the individual embodiments are described. Unless specified otherwise, the description of a part or aspect in one embodiment can apply to a corresponding part or aspect in another embodiment as well.

Figure 1:
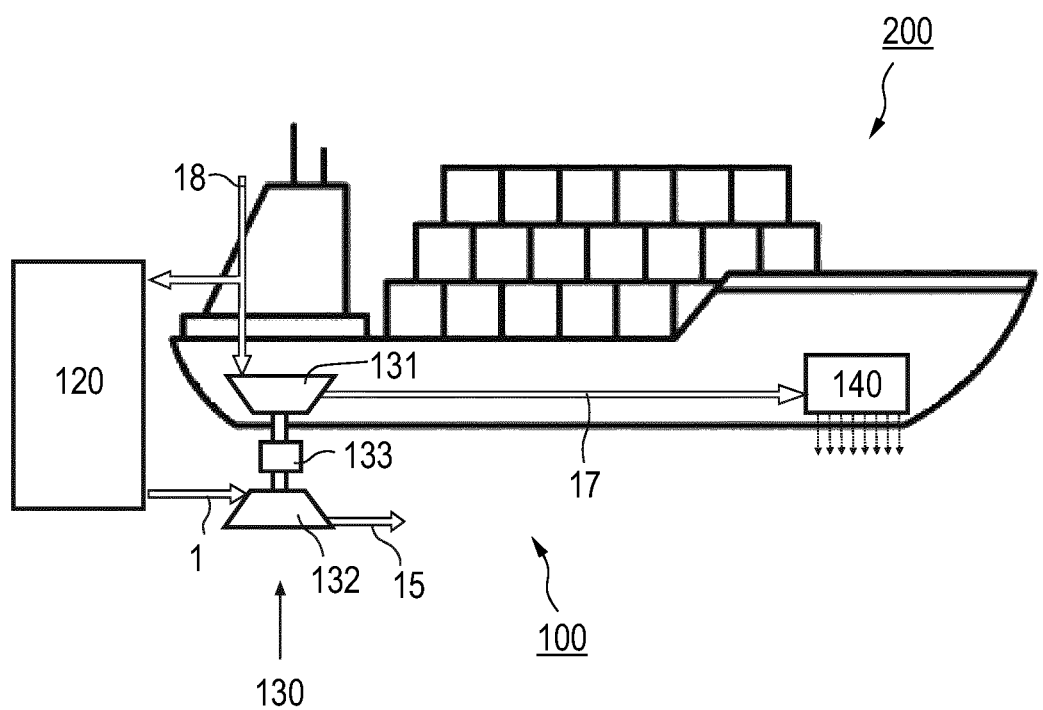
FIG. 1 shows a schematic view of an air supply apparatus according to embodiments described herein.

With exemplary reference to FIG. 1, an air supply apparatus 100 according to the present disclosure is described. According to embodiments, which can be combined with other embodiments described herein, the air supply apparatus 100 includes a first turbocharger 130 having a first compressor 131 and a first turbine 132. The first turbine 132 is drivable by exhaust gas provided from one or more engines 120. In this regard, it is to be noted, that "drivable by exhaust gas" can be understood in that exhaust gas is provided for driving. Accordingly, the first turbine 132 may be connected to the one or more engines 120, e.g. by one or more pipes, such that the one or more engines 120 can supply exhaust gas to the first turbine 132. The one or more engines 120 may be turbocharged. Accordingly, it is to be understood that the exhaust gas supplied from the one or more engines 120 to the first turbine 132 can already be expanded in one or more turbochargers of the one or more engines 120. The first compressor 131 is coupled to the first turbine 132 via a transmission 133 configured for changing a speed of the first compressor 131. In particular, the transmission 133 can be configured for varying a speed of the first compressor 131. For example, the transmission 133 can be configured for increasing the speed of the first compressor 131 compared to the speed of the first turbine 132. Additionally or alternatively, the transmission 133 can be configured for decreasing the speed of the first compressor 131 compared to the speed of the first turbine 132. Further, as exemplarily shown in FIG. 1, the air supply apparatus 100 includes an air lubrication device 140 for resistance reduction of the ship. The first compressor 131 is connected with the air lubrication device 140, particularly via a second air supply pipe 17, for supplying air to the air lubrication device 140.

Accordingly, beneficially an air supply apparatus with improved efficiency is provided. In particular, by providing a first turbocharger with a transmission as described herein has the advantage that the speed of the first compressor used for supplying air to the air lubrication device can be varied, and thus the amount of air supplied to the air lubrication device can be adjusted. For example, by using the transmission to increase the speed of the first compressor, the amount of air supplied to the air lubrication device can be increased. Accordingly, by decreasing the speed of the first compressor by means of the transmission, the amount of air supplied to the air lubrication device can be decreased. Hence, the amount of air supplied to the air lubrication device can be controlled on demand.

For example, by increasing the speed of the first compressor compared to the first turbine by means of the transmission provided there between, the efficiency of the first compressor for supplying air to the air lubrication device can be increased. Consequently, the effectivity of the air lubrication device can be improved, resulting in an increased bubble generation under the vessel's hull and thus a higher reduction of water-hull friction of the ship. As result thereof, the overall reduction of energy usage of the ship can be reduced such that savings of fuel can be achieved resulting in a reduction of the overall operation costs.

According to embodiments, which can be combined with other embodiments described herein, the transmission 133 can be a mechanical transmission, an electrical transmission, a pneumatic transmission or a hydraulic transmission. According to an example, which can be combined with other embodiments described herein, the transmission 133 includes a generator and an electric motor.

It is to be understood, that a transmission as described herein, e.g. the first transmission 133 and/or the second transmission 136 described in the following, can be configured to be variable. In other words, the first transmission 133 and/or the second transmission 136 can have a variable transmission ratio. Accordingly, a transmission as described herein may be configured for providing a changeable transmission ratio. Thus, the speed of the first compressor 131 and/or the second compressor 135 can beneficially be adjusted and controlled during operation of the ship, i.e. during operation of the one or more engines 120, particularly independently from the speed of the connected turbine, e.g. the first turbine 132 and/or the second turbine 134, as described herein.

Figure 2:
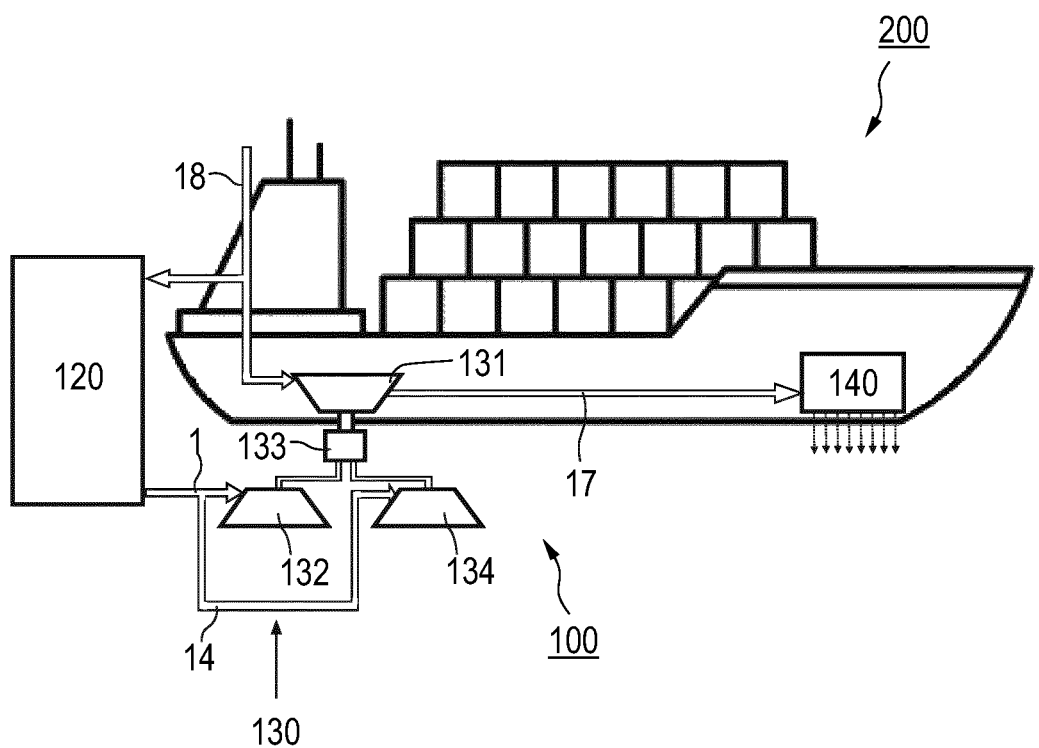
FIGS. 2 to 8 show schematic views of an air supply apparatus according to further embodiments described herein.

With exemplary reference to FIG. 2, according to embodiments, which can be combined with other embodiments described herein, the air supply apparatus 100 further includes a second turbine 134 in parallel to the first turbine 132. As exemplarily shown in FIG. 2, the first turbine 132 and the second turbine 134 can be coupled to the first compressor 131 via the transmission 133.

Figure 3:
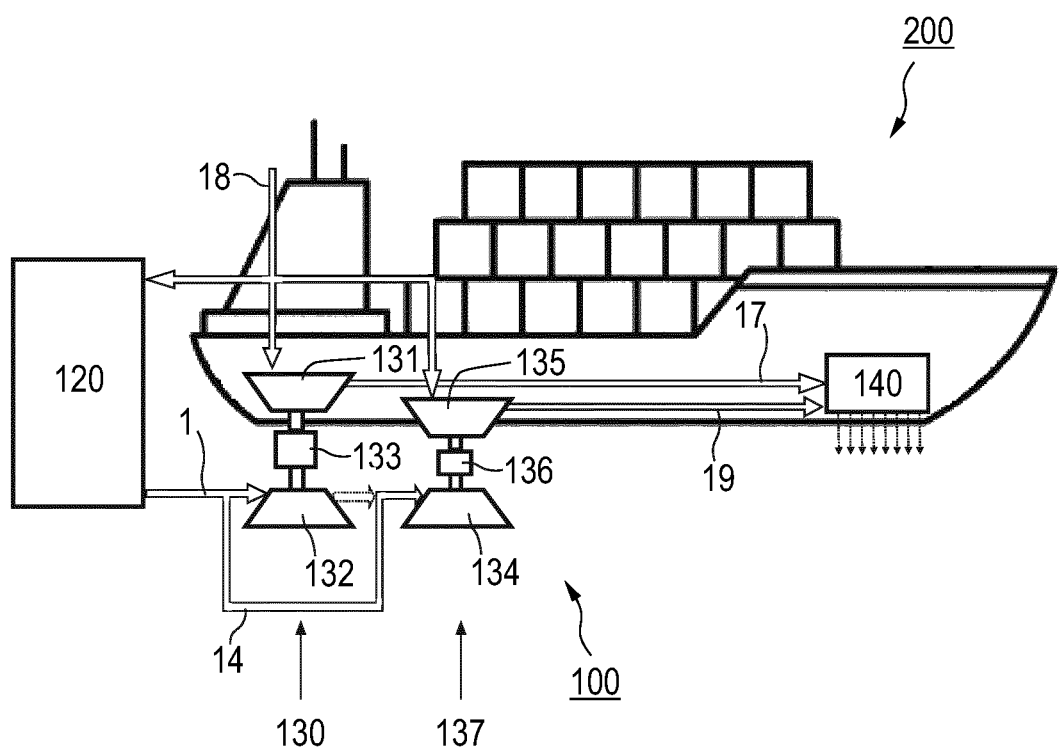
Figure 4:
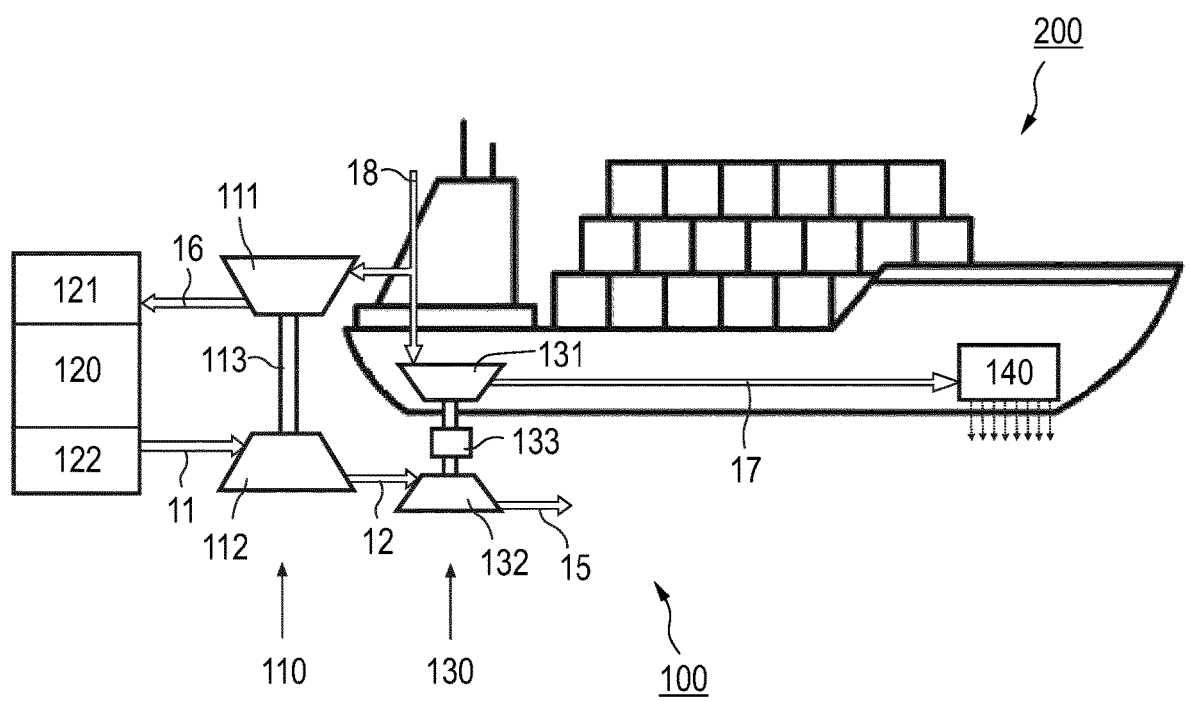
Figure 5:
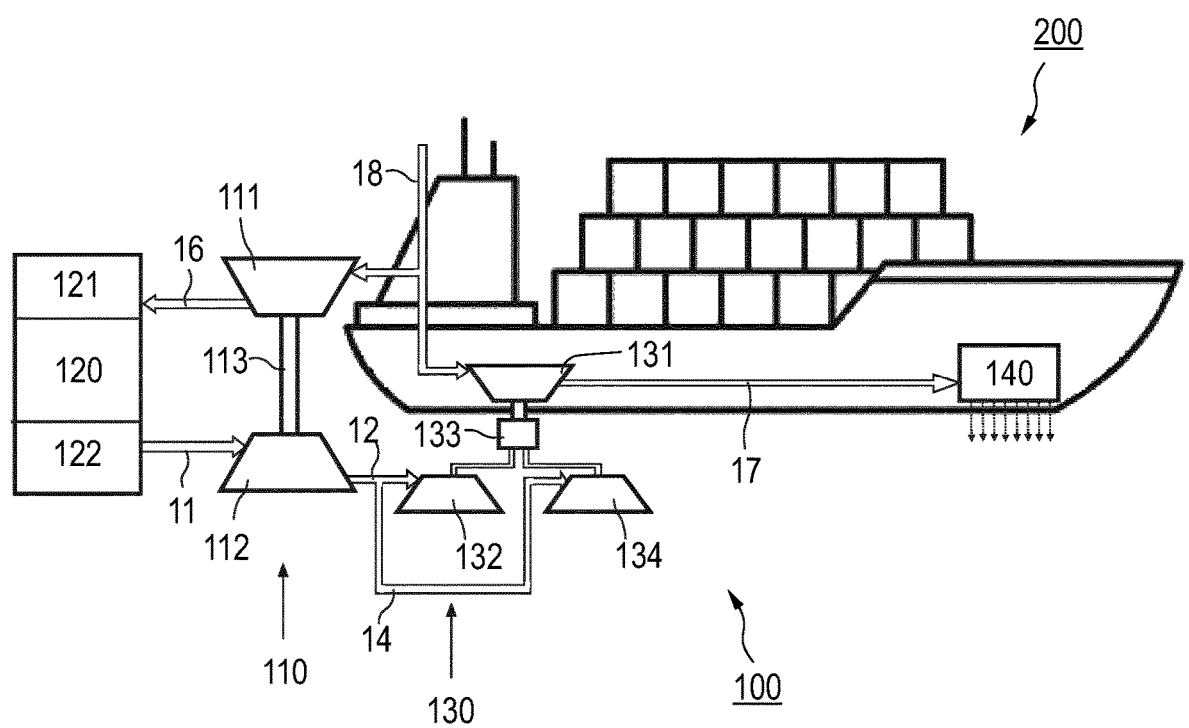
Figure 6:
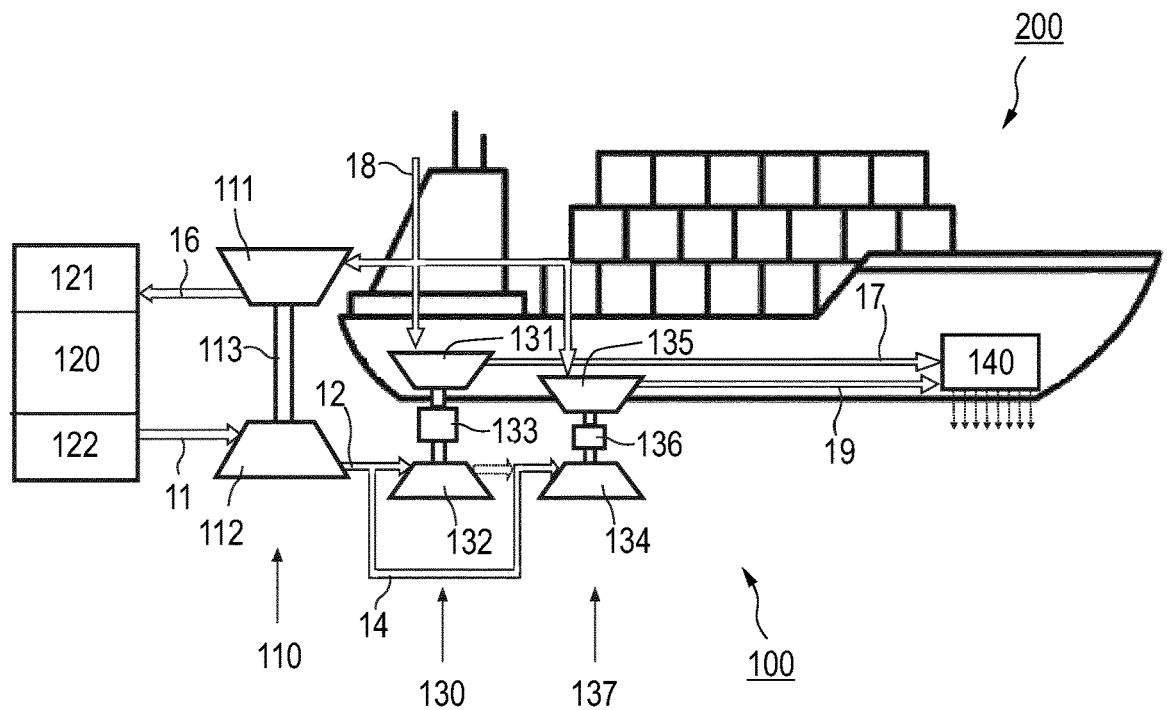
Figure 7:
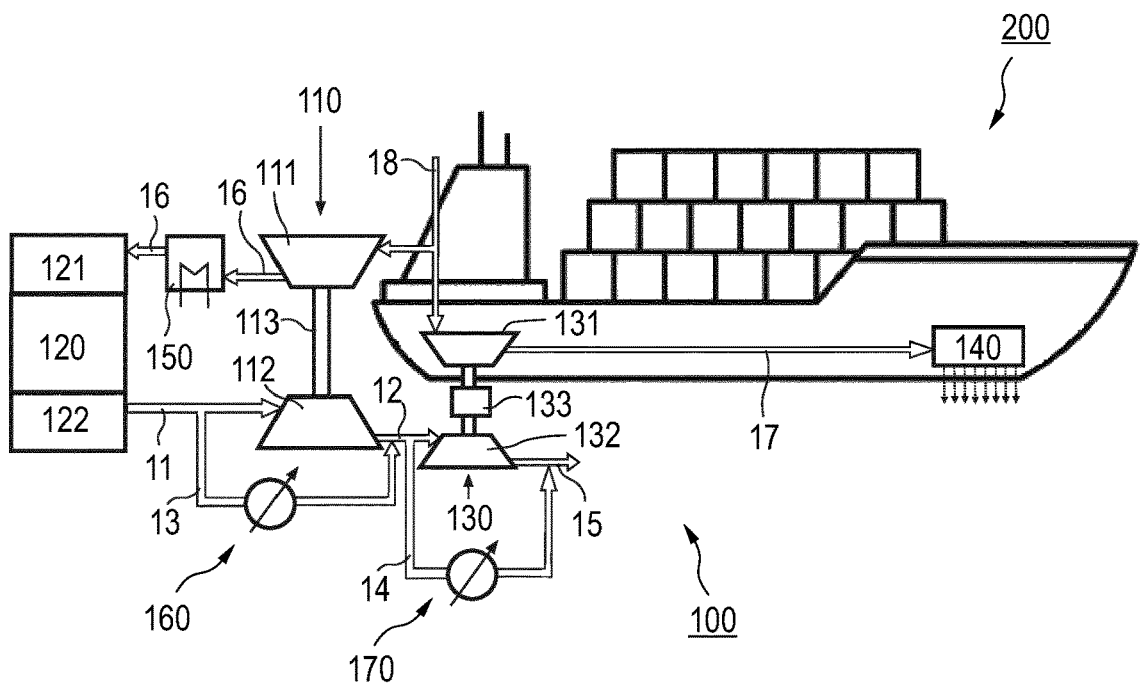

With exemplary reference to FIG. 3, according to embodiments, which can be combined with other embodiments described herein, the air supply apparatus further includes a second turbocharger 137 having a second compressor 135 and a second turbine 134. The second turbine 134 is drivable by exhaust gas provided from the one or more engines 120. Accordingly, the second turbine 134 may be connected to the one or more engines 120, e.g. by one or more pipes, such that the one or more engines 120 can supply exhaust gas to the second turbine 134. Additionally or alternatively, the second turbine 134 can be drivable by exhaust gas provided from the first turbine 132. Accordingly, the second turbine 134 may be connected to the first turbine 132, e.g. by one or more pipes, such that the first turbine 132 can supply exhaust gas to the second turbine 134. As exemplarily shown in FIG. 3, the second compressor 135 is connected with the air lubrication device 140, particularly via a third air supply pipe 19, for supplying air to the air lubrication device 140.

According to another optional implementation, which can be combined with other embodiments described herein, the second turbine 134 may be drivable by compressed air supplied from the first air supply pipe 16, as exemplarily shown in FIGS. 5 to 8, to the second turbine 134. Accordingly, it is to be understood that an air supply pipe (not explicitly shown in the figures) from the third compressor 111 to the second turbine 134 may be provided. Similarly, according to another example, which can be combined with other embodiments described herein, the first turbine 132 may be drivable by compressed air supplied from the first air supply pipe 16 (shown in FIGS. 5 to 8) to the first turbine 2 Accordingly, it is to be understood that an air supply pipe (not explicitly shown in the figures) from the third compressor 111 to the first turbine 132 may be provided.

As exemplarily shown in FIG. 3, typically the second compressor 135 is coupled to the second turbine 134 via a further transmission 136. The further transmission 136 is configured for changing a speed of the second compressor 135.

In particular, the further transmission 136 can be configured for varying a speed of the second compressor 135. For example, the further transmission 136 can be configured for increasing the speed of the second compressor 135 compared to the speed of the second turbine 134. Additionally or alternatively, the further transmission 136 can be configured for decreasing the speed of the second compressor 135 compared to the speed of the second turbine 134.

According to embodiments, which can be combined with other embodiments described herein, the further transmission 136 can be a mechanical transmission, an electrical transmission, a pneumatic transmission or a hydraulic transmission. According to an example, which can be combined with other embodiments described herein, the further transmission 136 includes a generator and an electric motor.

With exemplary reference to FIGS. 4 to 8, according to embodiments, which can be combined with other embodiments described herein, the air supply apparatus further includes a third turbocharger 110 having a third compressor 111 and a third turbine 112. For example, the third turbocharger 110 can be a turbocharger or several turbochargers for charging the one or more engines 120. In this regard, it is to be noted that the third turbocharger 110 shown in the figures may represent one or more turbochargers. Accordingly, it is to be understood that the one or more engines 120 may be charged or not (i.e. uncharged). As exemplarily shown in FIG. 4, the third turbine 112 is connected with an exhaust gas receiver 122 of the one or more engines 120 via a first exhaust gas pipe 11. Accordingly, it is to be understood, that typically the turbocharger of the air supply apparatus according to embodiments described herein, particularly the first turbocharger 130, is a separate turbocharger not employed for charging the engine. In other words, the first turbocharger 130 can be a secondary turbine-compressor pair provided in addition to a turbocharger for charging the engine. In particular, according to embodiments described herein which can be combined with other embodiments described herein, no mechanical force is taken from an engine's turbocharger main turbine (e.g. the third turbine 112) to the air supply apparatus.

Figure 8:
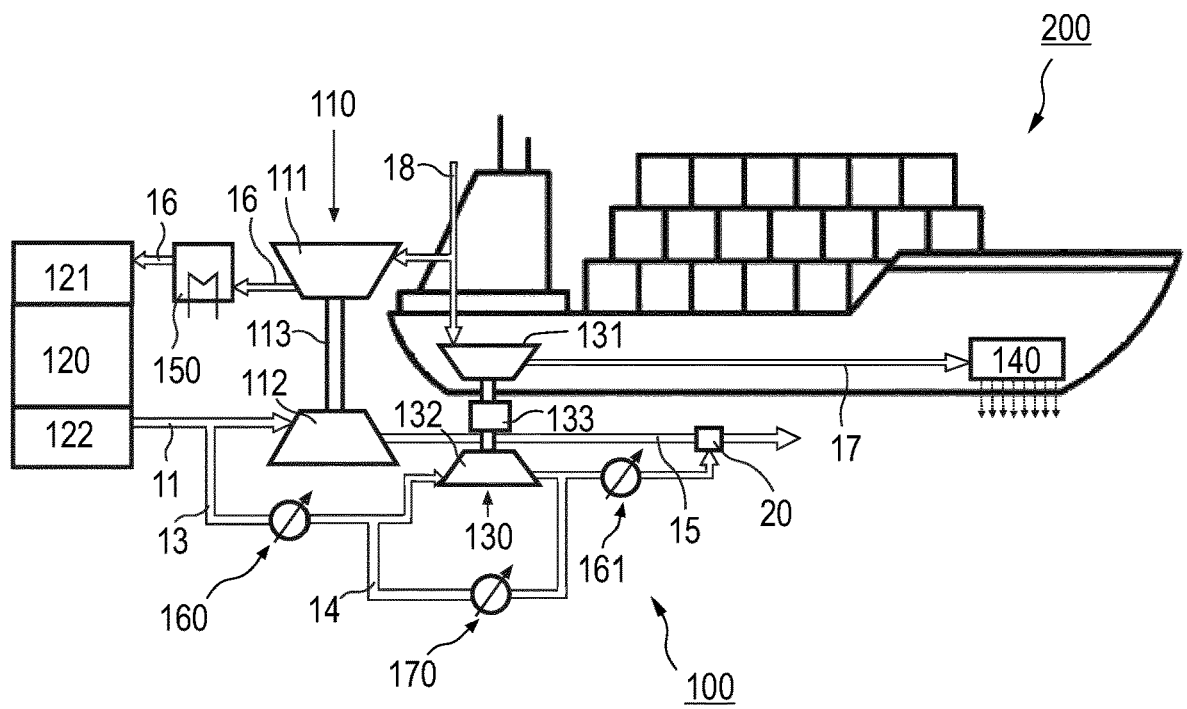

According to embodiments, which can be combined with other embodiments described herein, the first exhaust gas pipe 11 can be connected to a flow controller 160 for controlling an exhaust gas flow provided from the exhaust gas receiver 122 to the third turbine 112, as exemplarily shown in FIG. 8. In particular, the flow controller 160 may be provided in a first bypass piping 13 bypassing the third turbine 112.

With exemplary reference to FIG. 8, according to embodiments, which can be combined with other embodiments described herein, the first turbine 132 can be connected with the third turbine 112 via a second exhaust gas pipe 12. The second exhaust gas pipe 12 can be connected to a bypass valve 170 for controlling an exhaust gas flow provided from the third turbine 112 to the first turbine 132. In particular, the bypass valve 170 may be provided in a second bypass piping 14 bypassing the first turbine 132.

As exemplary shown in FIGS. 4 to 8, according to embodiments, which can be combined with other embodiments described herein, the third compressor can be connected with an air receiver 121 of the one or more engines 120 via a first air supply pipe 16. In particular, as exemplarily shown in FIG. 8, the first air supply pipe 16 includes a charge air cooler 150.

With exemplary reference to FIG. 8, according to embodiments, which can be combined with other embodiments described herein, a further flow controller 161 may be provided downstream of the first turbine 132 of the first turbocharger. The piping in which the further flow controller 161 is provided can be connected via an exhaust gas connection 20 to the exhaust gas outlet piping 15. The exhaust gas outlet piping 15 may be part of an exhaust system. The exhaust system can include an exhaust gas after-treatment apparatus and/or a silencer before the exhaust gas is released to the environment. In this regard, it is to be noted that an exhaust gas after-treatment apparatus and/or a silencer may also be provided in the other embodiments described herein.

Accordingly, from FIGS. 1 to 8 it is to be understood, that according to another aspect of the present disclosure a ship 200 including an air supply apparatus according to any embodiments described herein is provided. Thus, a ship with a more energy efficient system for water-hull friction reduction can be provided, such that the overall operation costs can be reduced.

Figure 9A:
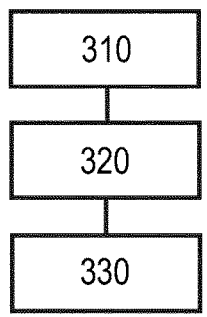
FIG. 9a shows a flowchart for illustrating a method of supplying air to an air lubrication device of a ship according to embodiments described herein.

With exemplary reference to the flowchart shown in FIG. 9a, a method 300 of supplying air to an air lubrication device of a ship according to the present disclosure is described.

According to embodiments, which can be combined with other embodiments described herein, the method 300 includes driving (represented by block 310 in FIG. 9a) a first turbocharger 130 by using exhaust gas from one or more engines 120. Additionally, the method includes changing (represented by block 320 in FIG. 9a) a speed of a first compressor 131 of the first turbocharger 130 by using a transmission 133 coupled to a first turbine 132 and to the first compressor 131 of the first turbocharger 130. Further, the method includes supplying (represented by block 330 in FIG. 9a) air from the first compressor 131 of the first turbocharger 130 to the air lubrication device 140.

In particular, changing (represented by block 320 in FIGS. 9a, 9b and 9c) the speed of a first compressor 131 may include varying the speed of the first compressor 131. For example, changing the speed of the first compressor 131 by using the transmission 133 can include increasing the speed of the first compressor 131 compared to the speed of the first turbine 132. Additionally or alternatively, the changing the speed of the first compressor 131 by using the transmission 133 can include decreasing the speed of the first compressor 131 compared to the speed of the first turbine 132.

Figure 9B:
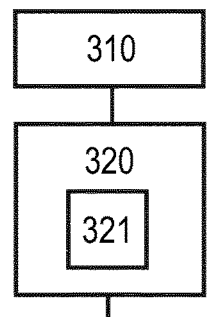
FIGS. 9b and 9c show flowcharts for illustrating a method of supplying air to an air lubrication device of a ship according to further embodiments described herein.

With exemplary reference to FIG. 9b, according to embodiments, which can be combined with other embodiments described herein, changing (represented by block 320 in FIG. 9b) the speed of the first compressor 131 comprises using (represented by block 321 in FIG. 9b) a second turbine 134 in parallel to the first turbine 132. The first turbine 132 and the second turbine 134 are coupled to the first compressor 131 via the transmission 133.

According to embodiments, which can be combined with other embodiments described herein, the method 300 further includes controlling (represented by block 335 in FIG. 9b) an amount of air provided to the air lubrication device 140 by controlling a rotational speed of the first turbocharger 130. The rotational speed of the first turbocharger 130 can be controlled by controlling an exhaust gas flow provided to a third turbine 112 of a third turbocharger 110 being connected with an exhaust gas receiver 122 of the one or more engines 120. The exhaust gas flow provided to the third turbine 112 of the third turbocharger 110 can be controlled by using (represented by block 336 in FIG. 9b) a flow controller 160, as exemplarily shown in FIGS. 7 and 8. In particular, the flow controller 160 can be provided in a first bypass piping 13 bypassing the third turbine 112, as exemplarily shown in FIGS. 7 and 8. Additionally or alternatively, controlling (represented by block 335 in FIG. 9b) the amount of air provided to the air lubrication device 140 can include controlling a rotational speed of the first turbocharger 130 by controlling an exhaust gas flow provided to the first turbine 132 by using (represented by block 337 in FIG. 9b) a bypass valve 170, as exemplarily shown in FIGS. 7 and 8. In particular, the bypass valve 170 can be provided in a second bypass piping 14 bypassing the first turbine 132. Additionally or alternatively, controlling (represented by block 335 in FIG. 9b) an amount of air provided to the air lubrication device 140 can include controlling a rotational speed of the first turbocharger 130 by using (represented by block 338 in FIG. 9b) a further flow controller 161 provided downstream of the first turbine 132 of the first turbocharger, as exemplarily described with reference to FIG. 8.

Figure 9C:
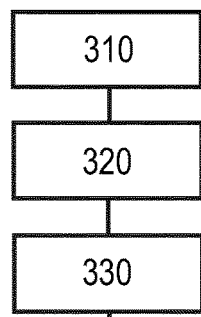

With exemplary reference to FIG. 9c, according to embodiments, which can be combined with other embodiments described herein, the method 300 further includes driving (represented by block 340 in FIG. 9c) a second turbocharger 137 by using exhaust gas from the one or more engines. Additionally or alternatively, driving (represented by block 340 in FIG. 9c) the second turbocharger 137 can be conducted by using exhaust from the first turbine 132. The second turbocharger 137 has a second compressor 135 coupled to a second turbine 134 via a further transmission 136. The further transmission 136 is configured for changing a speed of the second compressor 135. Additionally, the method 300 as exemplarily illustrated in FIG. 9c includes changing (represented by block 350 in FIG. 9c) a speed of the second compressor 135 by using the further transmission 136. Further, the method 300 includes supplying (represented by block 360 in FIG. 9c) air from the second compressor 135 of the second turbocharger 137 to the air lubrication device 140.

Accordingly, in view of the above, it is to be understood that embodiments described herein beneficially provide for an improved air lubrication device for which the amount of air supplied to the air lubrication device can be controlled and adjusted. In particular, as described herein, compared to the state of the art, the effectivity of the air lubrication device can be improved by employing a transmission for increasing the speed of a compressor used for supplying air to the air lubrication device. Accordingly, an increased bubble generation under the vessel's hull and thus a higher reduction of water-hull friction of the ship can be achieved, resulting in a reduction of the overall operation costs. Further, compared to the state of the art, embodiments as described herein have the advantage that residual energy of the turbine of the engine's turbocharger can be employed for operating the air supply apparatus. As consequence thereof, compared to the state of the art, embodiments as described herein provide for an improved energy efficiency. Moreover, embodiments as described herein beneficially provide for the possibility to compensate the so-called mismatching between compressor and turbine, by utilizing a separate turbocharger with a transmission coupling the turbine with the compressor used for bubble generation for hull lubrication.

While the foregoing is directed to embodiments, other and further embodiments may be devised without departing from the basic scope, and the scope is determined by the claims that follow.

REFERENCE NUMBERS 1 exhaust gas provided from one or more engines
11 first exhaust gas pipe
12 second exhaust gas pipe
13 first bypass piping
14 second bypass piping
15 exhaust gas outlet piping
16 first air supply pipe
17 second air supply pipe
18 air intake
19 third air supply pipe
20 exhaust gas connection
100 air supply apparatus
110 third turbocharger
111 third compressor
112 third turbine
113 shaft
120 one or more engine(s) possibly comprising one or more turbocharger(s)
121 air receiver
122 exhaust gas receiver
130 first turbocharger
131 first compressor
132 first turbine
133 transmission
134 second turbine
135 second compressor
136 further transmission
137 second turbocharger
140 air lubrication device
150 charge air cooler
160 flow controller
161 further flow controller
170 bypass valve
200 ship
300 method of supplying air to an air lubrication device
310, 320, 321, 330, 335, 336, 337, 338, 340, 350, 360 bocks representing method steps of the method of supplying air to an air lubrication device described in the present disclosure

The invention claimed is:

1. An air supply apparatus for a ship, comprising:
a first turbocharger having a first compressor and a first turbine being drivable by exhaust gas provided from one or more engines, wherein the first compressor is coupled to the first turbine via a transmission between the first compressor and the first turbine, said transmission having a variable transmission ratio such that a speed of the first compressor is changeable with respect to a speed of the first turbine; and
wherein the first compressor supplies air to generate bubbles under a hull of the ship to reduce water-hull friction of the ship.

2. The air supply apparatus of claim 1, wherein the transmission is a mechanical, electrical, pneumatic or hydraulic transmission.

3. The air supply apparatus of claim 1, further comprising a second turbine in parallel to the first turbine, the first turbine and the second turbine being coupled to the first compressor via the transmission.

4. The air supply apparatus of claim 1, wherein the transmission comprises a generator and an electric motor.

5. The air supply apparatus of claim 1, further comprising a second turbocharger having a second compressor and a second turbine, the second turbine being drivable by at least one of exhaust gas provided from the one or more engines and exhaust gas provided from the first turbine, the second compressor being coupled to the second turbine via a further transmission configured for changing a speed of the second compressor.

6. The air supply apparatus of claim 5, wherein the further transmission is a mechanical, electrical, pneumatic or hydraulic transmission.

7. The air supply apparatus of claim 1, further comprising a third turbocharger having a third compressor and a third turbine being connected with an exhaust gas receiver of the one or more engines via a first exhaust gas pipe, the first exhaust gas pipe being connected to a flow controller for controlling an exhaust gas flow provided from the exhaust gas receiver to the third turbine, particularly the flow controller being provided in a first bypass piping bypassing the third turbine.

8. The air supply apparatus of claim 7, the first turbine being connected with the third turbine via a second exhaust gas pipe, the second exhaust gas pipe being connected to a bypass valve for controlling an exhaust gas flow provided from the third turbine to the first turbine.

9. The air supply apparatus of claim 7, the third compressor being connected with an air receiver of the one or more engines via a first air supply pipe.

10. A ship comprising an air supply apparatus, the air supply apparatus comprising:
   a first turbocharger having a first compressor and a first turbine being drivable by exhaust gas provided from one or more engines, wherein the first compressor is coupled to the first turbine via a transmission between the first compressor and the first turbine, said transmission having a variable transmission ratio such that a speed of the first compressor is changeable with respect to a speed of the first turbine; and
   wherein the first compressor supplies air to generate bubbles under a hull of the ship to reduce water-hull friction of the ship lubrication device.

11. A method of supplying air for air lubrication of a hull of a ship, comprising:
   driving a first turbocharger by using exhaust gas from one or more engines;
   changing a speed of a first compressor with respect to a first turbine of the first turbocharger by using a transmission coupled to the first turbine and to the first compressor of the first turbocharger, said transmission between the first turbine and the first compressor, wherein the transmission has a variable transmission ratio such that the speed of the first compressor is changeable with respect to a speed of the first turbine; and
   supplying air from the first compressor of the first turbocharger to generate bubbles under a hull of the ship to reduce water-hull friction of the ship.

12. The method of claim 11, wherein changing the speed of the first compressor comprises using a second turbine in parallel to the first turbine, the first turbine and the second turbine being coupled to the first compressor via the transmission.

13. The method of claim 11, further comprising:
   driving a second turbocharger by at least one of using exhaust gas from the one or more engines and using exhaust from the first turbine, the second turbocharger having a second compressor being coupled to a second turbine via a further transmission configured for changing a speed of the second compressor,
   changing a speed of the second compressor by using the further transmission, and
   supplying air from the second compressor of the second turbocharger to generate the bubbles under the hull of the ship to reduce the water-hull friction of the ship.

14. The method of claim 11, further comprising controlling an amount of air provided to generate the bubbles under the hull of the ship to reduce the water-hull friction of the ship by controlling a rotational speed of the first turbocharger by controlling an exhaust gas flow provided to a third turbine of a third turbocharger being connected with an exhaust gas receiver of the one or more engines by using a flow controller.

15. The method of claim 11, further comprising controlling an amount of air provided to generate the bubbles under the hull of the ship to reduce the water-hull friction of the ship by controlling a rotational speed of the first turbocharger by controlling an exhaust gas flow provided to the first turbine by using a bypass valve, the bypass valve being provided in a second bypass piping bypassing the first turbine.

16. The air supply apparatus of claim 7, wherein the flow controller is provided in a first bypass piping bypassing the third turbine.

17. The air supple apparatus of claim 8, wherein the bypass valve is provided in a second bypass piping bypassing the first turbine.

18. The air supple apparatus of claim 9, wherein the first air supply pipe comprises a charge air cooler.

19. The air supply apparatus of claim 1, wherein the first turbocharger is a secondary turbine-compressor pair provided in addition to a turbocharger for charging the one or more engines.

20. The method of claim 14, wherein the flow controller is provided in a first bypass piping bypassing the third turbine.

* * * * *